Oct. 14, 1958    W. R. RICHARD, JR., ET AL    2,856,395
CONTROL OF POLYETHYLENE PROCESS
Filed May 12, 1954

INVENTORS
W. R. RICHARD, JR.
N. E. JONES
BY
*John D. Upham*
ATTORNEY

United States Patent Office

2,856,395
Patented Oct. 14, 1958

2,856,395

CONTROL OF POLYETHYLENE PROCESS

William R. Richard, Jr., and Norval E. Jones, Dayton, Ohio, assignors to Monsanto Chemical Company, St. Louis, Mo., a corporation of Delaware Application May 12, 1954, Serial No. 429,238

7 Claims. (Cl. 260—94.9)

This invention relates to the polymerization of ethylene to produce normally solid high molecular weight thermoplastic polymers generally known as polyethylene. The invention provides methods for controlling the highly exothermic polymerization of ethylene as carried out continuously in a tubular reactor. In some aspects the invention pertains to the control of ethylene polymerization effected in the presence of small quantities, e. g., less than 200 parts per million, free oxygen as catalyst.

Polyethylene is an exceptionally important material of commerce. This thermoplastic normally solid material, which melts at temperatures generally above 110° C. and shows, by X-ray diffraction analysis, the presence of a crystalline phase, is essentially a linear polymer of ethylene of high molecular weight, with controlled and limited branching and cross-linking of the polymer chains. Polyethylene has exceptional insulating qualities in electrical applications, and finds important use in such fields, especially where high frequency currents are involved, as in radar. Because of its flexibility at ordinary temperatures and its wide transition range, polyethylene is used in the molding of a large number of articles such as toys, kitchen utensils and the like. Polyethylene can be modified in properties somewhat by use of comonomers, e. g., vinyl acetate, vinyl chloride, polyhaloethylenes, along with the ethylene being polymerized.

Polyethylene is most effectively produced by subjecting ethylene to the polymerizing action of elevated temperatures while maintained at relatively high pressures, usually at least 5,000 pounds per square inch and often above 20,000 pounds per square inch. The ethylene polymerization reaction is comparatively slow in the absence of catalyst. Organic and inorganic peroxy type catalysts, e. g., benzoyl peroxide, cumene hydroperoxide, potassium persulfate, or azo-type, e. g., azo-bis(isobutyronitrile), and various other free-radical promoting catalysts, can be used. One of the simplest and most effective catalysts is free oxygen. Thus, a mixture of ethylene containing a small quantity of free oxygen, such as less than 500 parts per million oxygen based on the ethylene and preferably less than 200 parts per million oxygen, when subjected to temperatures of 200 to 300° C. at pressures of from 20,000 to 40,000 pounds per square inch undergoes polymerization to form polyethylene. The yields will depend upon the reaction time, but may range from 5 to 25 percent and perhaps even higher. See Fawcett et al. U. S. Patent 2,153,553, directed broadly to polyethylene, Perrin et al. U. S. Patent 2,188,465, directed to use of oxygen as catalyst for making polyethylene, Perrin et al. U. S. Patent 2,200,429, directed to polymerization of ethylene with comonomers.

The polymerization of ethylene is highly exothermic. In order to produce a commercially valuable polyethylene product at a reasonable rate, it is often desirable to effect the ethylene polymerization at reaction conditions that provide a rapid polymerization and that are only slightly less severe than those causing an uncontrolled polymerization in the nature of an explosion resulting in decomposition of ethylene and polyethylene and often formation of free carbon in the reactor. In order to obtain practical reaction rates and production rates, the ethylene-oxygen mixture must be passed continuously through an elongated tube. Considerations of heat transfer, taken in conjunction with the fact that the polymerization reaction is highly exothermic and must be carefully controlled, require that the reaction tube be of comparatively small diameter. As a result the ratio of the length of the reaction tube to the internal diameter of the reaction tube is quite high, for example, at least about 300:1 to 500:1, and often on up to 1,000:1 and higher. For purposes of heat removal and reaction control, the polymerization reaction tube should be surrounded by a fluid, preferably liquid, heat exchange medium, e. g., liquid diphenyl oxide, hydrocarbon oil, air, cooled combustion gases, or the like, circulated at a rate adequate to obtain the desired heat removal during the polymerization and the desired preheating of the ethylene feed up to the polymerization temperature. Of course, preheating can be done in a vessel or tube separated from the reactor, but as a practical matter it is essential that they provide in essence a single continuous flow path.

The quality of polyethylene product with respect to molecular weight, flow characteristics and other properties is dependent on a number of the reaction variables, including pressure, temperature, and oxygen content where oxygen is used as catalyst. The polymerization is effected at conditions chosen to provide certain desired properties in the polyethylene product. Of course, these properties and the values thereof will be dependent to a great extent on the particular use for which the polyethylene is intended. By way of example, however, one of the important properties is the Melt Index, a measure of the flow rate of the polymer as determined by an extrusion plastometer, test method ASTM D-1238. As reported in decigrams polymer per minute, the melt index will range from 0.5 to 5 for most purposes.

One practical method of conducting the polymerization reaction and obtaining product meeting the usual commercial standards involves maintaining reaction conditions such that the system is almost "on the verge" of an explosion. By "explosion" is meant an extremely rapid highly exothermic degradation, ranging in severity from discoloration of the polymer product up to essentially complete carbonization of ethylene and polymer. Under such circumstances, exceedingly close control is required. However, in practice it is found that the operation of the reactor may be "lined out" for perhaps a number of hours, and the process has apparently reached steady state conditions, when without apparent reason an uncontrollable explosive polymerization rate occurs with a sharp increase in temperature and formation of elemental carbon in the reactor and process stream. This results in a very serious loss of production, and also contaminates the product which is being collected at that time. For these reasons, it is necessary to reduce the severity of the reaction conditions somewhat below those that might be desired in order to obtain maximum conversion and/or optimum properties in the finished product, so as to reduce the frequency of occurrence of these explosions. Thus, any one or all of the conditions, temperature, pressure and oxygen content will be maintained at a lower value than might be possible if this problem did not exist.

The present invention makes possible the substantially complete elimination of these problems. In accordance with the invention, the flow of ethylene through the initial portion of the reaction tube is caused to be of restricted effective diameter as compared with the remainder of the tube. In the preferred embodiments of the invention, this is accomplished by causing an annular flow of the ethylene in the first portion of the reaction tube, which annular flow is of smaller effective diameter than the effective diameter of flow through the remainder of the tube.

This latter is advantageously accomplished by providing within the initial portion of the total reaction tube a core in the form of a rod or tube whose outside diameter is smaller than the inside diameter of the said initial portion of the reaction tube. Such rod (or tube) is axially positioned in the center of the reaction tube. There results an annular space running from the beginning to the end of the rod, speaking in this connection with respect to the direction of flow of ethylene. Preferably and ordinarily the rod starts at the inlet end of the reaction tube. Such annular flow is much preferred over the alternative use of a smaller diameter tube as the initial portion of the total reaction tube for several reasons, including the fact that if desired the length of the rod may be adjusted from time to time or more or less continuously whenever the reaction system requires it, and especially because for a given heat transfer rate the annular flow path provided by a tube containing an internal rod has larger cross-sectional area than that provided by a small diameter tube.

As stated, annular flow is preferred for the initial portion of the total flow path. Less preferred, but permissible, is cylindrical flow through an unobstructed tubing of smaller effective diameter than the remainder of the tube. With either arrangement, the remainder of the flow path (between the initial portion and the exit end of the reactor tube) can be either cylindrical (unobstructed tube) or annular (tube with core), but it is essential that the effective diameter of said initial portion be less than that of said remainder. By "effective diameter" as used herein is meant the outer diameter of a tubular flow path, minus the inner diameter in case said tubular flow path is an annulus. Thus, in the case of cylindrical flow, i. e., flow through an unobstructed tube, the "effective diameter" is the outer diameter of the flow path; in terms of the tube this is the inside diameter of the tube. In the case of annular flow, i. e., flow through a tube having a core, the "effective diameter" is the outer diameter of the flow path minus the inner diameter of the flow path; in terms of the tube and core, such as a rod, this is the inside diameter of the tube minus the diameter of the rod.

We have found that the present invention very greatly facilitates the operation of the ethylene polymerization process. Thus, over a long period of research on the polymerization of ethylene in a system of the type described herein, explosive decomposition has occurred with distressing frequency despite numerous attempts to avoid same. As mentioned above, such explosions often occur without preliminary warning in the way of a notable change in any of the operating variables. The use of the present invention reduced such explosions to a very high degree, and when they did occur it was usually because the operating conditions were being pushed to their utmost limits for the purpose of determining the effects of different variables on conversion and product quality. We found that operation of the reactor could be consistently maintained, without explosive decompositions, at conditions which before the practice of the invention had resulted in the frequent occurrence of the explosions. In other words, at operating conditions which cannot be consistently maintained over a long period of time because interrupted by explosions within the reactor, the provision of an internal rod within the first portion of the reaction tube, as described herein, permitted such operation at said conditions to continue uninterrupted. By way of further example, a reactor which had been consistently running for a long period of time with a metal rod inserted in the initial portion of the reactor tube, was continued in its operation with the exception that the tube was removed. Twenty-three minutes after removal of the tube, although conditions had not been altered from those previously employed, an explosion occurred.

We do not wish the present invention to be limited because of any particular theory of operation advanced. However, it is believed that the success of this invention may be explained in the following manner. In the standard elongated reaction tube, wherein a mixture of ethylene with a small quantity of oxygen is forced through the tube under high pressure, the tube being surrounded by fluid heat-exchange medium, and a final reaction mixture comprising unreacted ethylene plus polyethylene product exits from the other end of the tube, a large mass of unreacted ethylene mixed with oxygen is present in the initial portion of the tube, and is approaching reaction temperature. Under these conditions, this mass is extremely susceptible to violent polymerization reaction. Also, the polymerization is believed to have an induction period, so that a brief period of time elapses between attainment of conditions which cause polymerization, and the actual initiation of the polymerization in the reaction mixture. Under these conditions, it is very easy for an uncontrolled polymerization to "flashback" into the initial portion of the reaction tube, whether such uncontrolled polymerization started well beyond the initial portion of the tube in the reacting mixture, or at or near the point in the tube at which the polymerization is first being initiated. Such explosions can occur at any place within the reaction tube, but it is believed that the presence of polyethylene product in the reaction mixture tends to minimize the occurrence and/or severity of the explosions, probably because of the lowered concentration of ethylene. On the other hand, in the initial portion of the reaction tube where polymerization has not occurred either because reaction temperature has not been attained or because the ethylene is undergoing its induction period, or both, once such an uncontrolled reaction begins the absence of any polyethylene results in increased severity or perhaps allows the explosion to begin at conditions somewhat milder than those required further along in the reaction tube. Frequently, explosive reactions occur without any preliminary warning of the nature that might be expected, such as a change in operating variables or change in temperature profile along the tube. Regardless of the initiating cause, the comparatively small quantity of ethylene mixed with oxygen that is present in the initial portion of the tube, because it is of restricted effective diameter as compared with the rest of the tube, and the rapidity with which that material is being brought to conditions at which the reaction can start in a normal manner, greatly reduces the frequency with which the explosions occur at otherwise the same reaction conditions.

The proportion of the total volume of the reactor tube which is caused to be of restricted effective diameter, viz. the initial portion, is best chosen so that the polymerization reaction is initiated in the vicinity where such initial portion joins the remainder of the tube. In other words, the ethylene (with or without a minor proportion of comonomer) is caused to flow initially in a path of restricted effective diameter until polymerization is initiated, and thereafter through a flow path of greater effective diameter than that initially used. As a practical matter, when operating within a general range of the various reaction conditions that are chosen to give a desired conversion and type of product, moderate changes in the operating variables will not markedly change the point at which the reaction is initiated. Thus, the reactor can advantageously be made up of a highly elongated tubing of comparatively small diameter, to permit good heat-exchange with surrounding heat-exchange fluid, and containing in the initial portion thereof a solid metal rod (or closed tube) which is fixed in length and which, being placed in the center of the tube, forms an annular flow path as the initial portion of the total path of the ethylene through the process. Similarly, though less desirably, the initial portion of the reaction tube can be unobstructed tubing of smaller diameter than the effective diameter of the principal portion of the tube through which the ethylene reaction mixture subsequently flows. Here, too, the relative volumes can be fixed for a general range of reaction conditions. One modification of the invention, however, provides an internal rod or tube core for the initial portion of the total reaction tube, which core is adjustable in length. Where changes in overall ranges of reaction conditions are infrequent, the core can be so constructed that it can be replaced by a shorter or longer core by shutting down the equipment. Where more frequent changes in general conditions are anticipated, suitable mechanical means are provided for either continuously or periodically adjusting the length of the core maintained within said tube whenever necessary to maintain stable reaction conditions that avoid explosions in the reaction tube.

In any event, the ratio of the dwell time of the ethylene in the initial portion of the reaction tube (or stated another way, in the initial portion of the ethylene flow path) to the dwell time of the reaction mixture in the remainder of the tube or flow path, is less than 0.35:1. In other words, the volume of the initial portion, in which the flow path is of smaller effective diameter than the remaining portion, constitutes about one-fourth or less of the total volume of reaction tube or flow path. The ratios of two volumes is numerically the same as the ratios of the two dwell times in said volumes. Dwell time is defined as the volume in question divided by the flow rate, and has the dimensions of time. Since in a given straight-through flow system the flow rate is essentially constant throughout all portions of the system, the ratio of the dwell times in two different portions or volumes of the system are numerically the same as the ratio of said volumes, since the flow rate term cancels out. Thus, the ratio of the dwell time in the initial portion of the reactor which has a restricted effective diameter, to the dwell time in the remainder of the reactor tube, is numerically the same as the ratio of the volume of said initial portion to the volume of said remainder. In most instances, the ratio will be within the range of 0.05:1 to 0.35:1. It is ordinarily preferred that the ratio of the dwell time in the initial portion to the dwell time in the remainder be less than 0.25:1. In considering these ratios, for the sake of definiteness, the initial portion can be considered to be that portion of the tube in which the ethylene is being rapidly brought to reaction temperature and in which the induction period is occurring. Obviously, a longer dwell time will be required when feeding ethylene to the system at a temperature of say 0° C., than in the case where ethylene is being fed to the system at say 100° C. In the former case, a greater volume or dwell time will be required for the preheating of the ethylene. Since the dangers of explosive polymerization are greatest when a mass of ethylene is in the neighborhood of the polymerization initiation temperature or not far below that temperature, the initial portion of the tubular reactor, when dealing with the numerical ratios mentioned above, can be considered to start at the point in the flow at which the ethylene feed is no more than 50° C. below the temperature at which the polymerization is being initiated in the particular system. In other words, if the ethylene must be preheated from a temperature below said value of 50° C. below the polymerization initiation temperature, such preheating to the first-mentioned temperature may or may not be effected in a tubular flow path of restricted effective diameter, as desired in the particular situation, and if it is of restricted effective diameter the ratio of the volume of all of the tube of restricted effective diameter to that of the remainder, may in some cases exceed the numerical values given.

As a further guide, the effective diameter of the initial portion should ordinarily be from about one-fourth to about one-half the effective diameter of the remaining portion. More broadly, the ratio of the effective diameter of the initial portion to the effective diameter of the remaining portion will almost always be within the approximate range of 0.2:1 to 0.8:1.

In the accompanying schematic drawing, which is partly in elevation and partly in vertical cross section:

Figure 1:
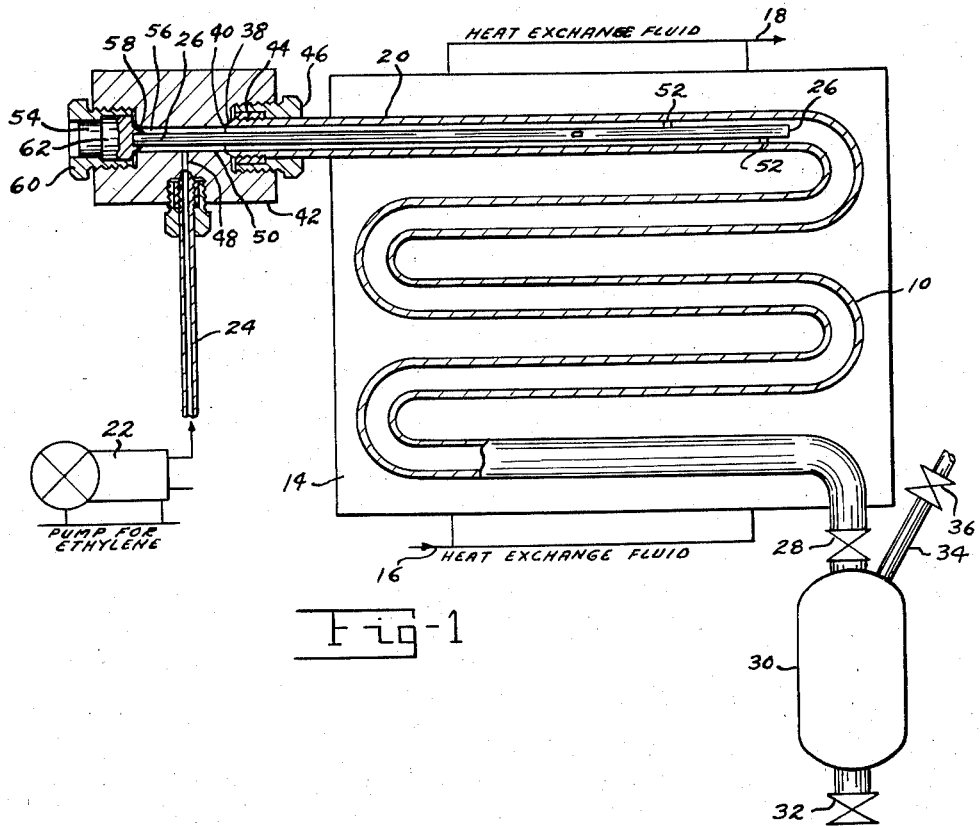
Figure 1 illustrates one suitable apparatus for practicing the invention.

It will be appreciated that many changes in form and construction, from the exact details shown in the drawing, can be made without departing from the invention. Thus, while a single elongated reaction tube is shown in Figure 1, a plurality of similarly constructed reaction tubes can of course be operated in parallel to obtain correspondingly greater production. The drawing is diagrammatic in form and those skilled in the art will understand the numerous apparatus elements such as compressors, valves, coolers, condensers, controls, and the like that will be necessary. Like numerals designate like structures in the two figures.

Referring first to Figure 1, a polymerization reaction tube is designated by the reference numeral 10. This tube is shown in convolute form, but it is not outside the scope of the invention to have the tube in other form, such as straight. It will be appreciated that this is high pressure equipment and suitable steels and construction methods must be used. The reaction tube 10 is shown enclosed in a structure or vessel 14 through which a fluid heat-exchange medium is passed, entering from line 16 and leaving through line 18. Conveniently, the entering heat-exchange fluid is at a temperature below the desired reaction temperature and during its flow across the latter portions of the reaction tube adsorbs heat of reaction. Correspondingly, as the heat-exchange fluid flows over the initial portion 20 of reactor tube 10, the ethylene flowing therethrough, which has been introduced by means of pump 22 and line 24 at a temperature below the reaction temperature, is brought to said reaction temperature during flow through said initial portion 20 by absorption of heat from the heat-exchange medium in contact with the outside of said initial portion of the tube. Of course, various other arrangements are permissible which will accomplish the imparting of heat to the reaction mixture in the initial portion of the reaction tube and the abstraction of heat from the reaction mixture in the remainder of the tube. The ethylene reactant preferably has had admixed therewith a small quantity of pure molecular oxygen. The ethylene then enters the initial portion 20 of the total reaction tube 10. The induction period occurs during the dwell time of the ethylene in said initial portion, and the reaction is initiated in the vicinity where the initial portion 20 joins the remainder of the reaction tube 10.

The initial portion 20 of the reaction tube is defined as that portion within which the core 26 is located. This core is preferably a solid metal rod made of suitable material to withstand the reaction conditions, and its outside diameter is somewhat smaller than the inside diameter of the reaction tube. A rod 26 is shown extending from the beginning of the reaction tube 10 and through most of the length of the first tubular section before the first return bend. The instructions given hereinbefore with respect to the ratio of the dwell time in the initial portion of the reaction tube to the dwell time in the remainder of the reaction tube should be followed in establishing the length of the rod or core 26. If desired, core 26 can be cooled or heated, either by cooling or heating the initial end of rod 26 (the end to the left in Figure 1) by means not shown, or core 26 can be a tube which is closed at the end farthest along the reaction tube and within which is another smaller tube (not shown) through which cooling or heating medium such as water is introduced into the core 26, said cooling or heating heat transfer medium then going out through said tube 26. For most purposes and for simple operation the core 26 is preferred in the form of a solid metal rod which is not deliberately cooled other than by contact with the ethylene being forced into the reaction tube from line 24. It is well to cause at least the last part of the preheating of ethylene feed to reaction temperature to occur in the rodded first section 20 of the tube 10, so that at least some preheating plus at least most of the induction period occurs during the dwell time of the ethylene in said first section. The ethylene as it enters said first section can be, for example, 50° C. below the temperature at which polymerization is initiated.

A final reaction mixture of unreacted ethylene and ethylene polymer leaves the reaction tube 10 and passes through let-down valve 28 which reduces the pressure considerably. A separation of polymer from ethylene then occurs in separator 30, which preferably is maintained at a temperature above the melting point of polymer so that a pool of molten polyethylene collects in the bottom of separator 30. Such molten polyethylene product is recovered by extrusion through valve 32. Separator 30 is shown diagrammatically, and may be of any suitable construction. It will be understood that the drawing is not to scale, and that separator 30 should be sufficiently large to hold an appreciable quantity of the molten polyethylene. Separated ethylene is recovered through line 34 and valve 36.

The initial end of reaction tube 10, which is of course the initial end of the initial portion 20 of the reaction tube, is in the form of a male cone 38 which makes a pressure-tight seal with the female cone seat 40 in block 42. A sleeve 44 is screwed on to the end of the initial portion of tube 10, and gland 46, which screws into block 42, bears against sleeve 44, thus forcing cone 38 into seat 40 and maintaining the seal against pressure. Inlet tube 24 is made up into block 42 in exactly the same manner, and for the sake of simplicity on the drawing reference numerals will not be given to the corresponding parts. It will be seen that the incoming ethylene entering from tube 24 flows through channels 48 and 50 in block 42 and on into the initial portion 20 of tube 10.

That portion of rod 26 maintained within the initial portion 20 of tube 10 is provided with spacers 52, that can take the form of small bosses on rod 26. Rod 26 is inserted into and maintained in the tube 20 in a pressure-tight manner by means of a plug 54 into the coned end of which the end of rod 26 is welded. The male cone end of plug 54 seats against a female cone seat at 58 in block 42, and is held pressure-tight by the action of gland 60 which screws into block 42 and bears against shoulder 62 on plug 54.

It is very convenient, whenever it is desired to change the dwell time in the initial portion 20 of tube 10, to unscrew gland 60, of course first letting down the pressure in the system, remove plug 54 and rod 26, and then insert a similar plug and rod having different length and/or diameter. This can be done whenever a significant change in operating variables is instituted or occurs, for example a change in temperature of entering ethylene feed, of reaction mixture temperature at any place along tube 10, of pressure drop across all or a portion of tube 10, or a change in catalyst concentration, and the like.

Figure 2:
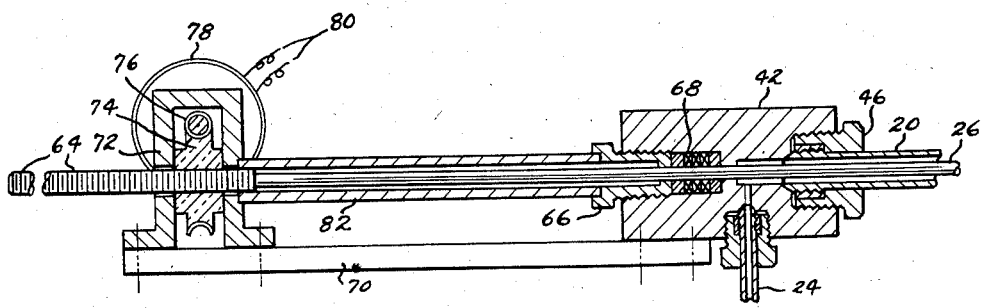
Figure 2 shows an apparatus suitable for controlling the relative length of the control rod maintained within the first section of the tubular reactor.

Figure 2 illustrates a modification of the construction of rod 26 permitting the intermittent or continuous adjustment of the length thereof within the initial portion 20 of tube 10 without the necessity of shutting down the flow of ethylene or of depressuring the reaction system. The connection of tubes 20 and 24 with block 42 are the same as shown and described above for Figure 1, and therefore this description will not be repeated for Figure 2. Rod 26, however, continues to extend through and out of block 42 and terminates in a screw 64. A pressure-tight seal around rod 22 is provided by packing gland 66 bearing on packing 68 within block 42. Block 42 is mounted on a support 70, as is a housing 72. Within housing 72, worm wheel 74 runs on screw 64, the hold through the center of worm wheel 74 of course being threaded to correspond to the threads on screw 64. Worm wheel 74 is driven by worm 76, which in turn is driven by motor 78. Operation of motor 78, for the purpose of moving rod 26 longitudinally within tube 20, is controlled in response to any of the reaction variables mentioned herein, by means diagrammatically indicated by wires 80.

Tube 82, supported by housing 72 and gland 66 or block 42, loosely fits over that portion of rod 26 extending between said housing 72 and block 42 to support the rod and avoid any tendency toward buckling when rod 26 is forced towards and farther into reaction tube 20 against the high reaction pressure.

While the invention has been described with particular reference to various preferred embodiments thereof, it will be appreciated that numerous modifications and variations are possible without departing from the invention.

We claim:
1. In a process for effecting the polymerization of ethylene at high pressure to form normally solid polyethylene, wherein ethylene is continuously forced through a small diameter highly elongated tube surrounded by a fluid heat-exchange medium and thereby maintained at reaction conditions effective to produce a final reaction mixture of polyethylene plus unreacted ethylene exiting from the tube, the improved method of controlling the highly exothermic polymerization reaction and avoiding explosions in the reaction tube which comprises causing the flow of ethylene through the initial portion of said tube to be annular and of smaller effective diameter than the effective diameter of flow in the remainder of said tube, the ratio of the dwell time in said initial portion to the dwell time in said remainder being within the range of 0.05 to 0.35.

2. Process according to claim 1 wherein the ratio of the dwell time in said initial portion to the dwell time in said remainder is within the range of 0.05 to 0.25.

3. Process according to claim 1 wherein the dwell time in said initial portion is such that the polymerization reaction is initated in the vicinity where said initial portion joins the remainder of said tube.

4. In a process for effecting the polymerization of ethylene at high presures to form normally solid polyethylene, wherein ethylene is continuously forced through a small diameter highly elongated tube having an esentially constant diameter throughout its length and surrounded by a fluid heat-exchange medium and thereby maintained at reaction conditions effective to produce a final reaction mixture of polyethylene plus unreacted ethylene exiting from the tube, the improvement which comprises axially positioning in the initial portion of said tube a solid metal rod of diameter smaller than the inside diameter of said tube thereby forming an annular flow path in said initial portion, the ratio of the dwell time in said initial portion containing said rod to the dwell time in the remainder of said tube not containing said rod being within the range of 0.05 to 0.35, and changing said ratio within said range by adjusting the length of said rod maintained within said tube whenever necessary to maintain stable reaction conditions that avoid explosions in the reaction tube.

5. In a process for effecting the polymerization of ethylene at high pressures in the presence of controlled small quantities of free oxygen as catalyst to form normally solid polyethylene, wherein ethylene is continuously forced through a small diameter highly elongated tube, having a length to diameter ratio of at least 500, surrounded by a fluid heat-exchange medium and thereby maintained at reaction conditions effective to produce a final reaction mixture of polyethylene plus unreacted ethylene exiting from the tube, the improved method of controlling the highly exothermic polymerization reaction and avoiding explosions in the reaction tube which comprises causing the flow of ethylene through the initial portion of said tube to be annular and of smaller effective diameter then the effective diameter of flow in the remainder of said tube, the ratio of the dwell time in said initial portion to the dwell time in said remainder being within the range of 0.05 to 0.35.

6. Process according to claim 1 wherein ethylene containing catalyst is introduced into said tube at a temperature below reaction temperature and is brought to reaction temperature during flow through said initial portion by absorption of heat from said fluid exchange medium, wherein the length of said initial portion is such that any induction period occurs during dwell time of ethylene in said initial portion and the polymerization reaction is initiated in the vicinity where initial portion joins the remainder of said tube, and wherein exothermic heat of reaction is absorbed by said fluid heat-exchange medium from the flowing reaction mixture in the remainder of said tube.

7. Process according to claim 1 wherein the ratio of the effective diameter of said initial portion to the effective diameter of said remainder is within the range of 0.2:1 to 0.8:1.

References Cited in the file of this patent

FOREIGN PATENTS 588,143  Great Britain _____ May 15, 1947